United States Patent [19]

Wiegand

[11] 4,017,856
[45] Apr. 12, 1977

[54] SELF-CALIBRATING MICROWAVE TRANSPONDER

[75] Inventor: Richard J. Wiegand, Severna Park, Md.

[73] Assignee: Westinghouse Electric Corporation, Pittsburgh, Pa.

[22] Filed: Mar. 10, 1976

[21] Appl. No.: 665,464

[52] U.S. Cl. .............................. 343/18 E; 343/17.7
[51] Int. Cl.² ...................... G01S 7/38; G01S 7/40
[58] Field of Search ........................ 343/17.7, 18 E

[56] References Cited
UNITED STATES PATENTS

| 3,044,061 | 7/1962 | Richmond et al. | 343/18 E |
| 3,971,021 | 7/1976 | Cann | 343/18 E |
| 3,983,482 | 9/1976 | Doherty | 343/18 E X |

Primary Examiner—T.H. Tubbesing
Attorney, Agent, or Firm—R. M. Trepp

[57] ABSTRACT

A self-calibrating microwave transponder incorporating an amplifier, modulator, instantaneous frequency discriminator, memory and voltage controlled oscillator is described which may generate an RF signal in response to the carrier frequency of received low duty cycle pulse RF signals. The instantaneous frequency discriminator is used to provide an address signal from the pulse RF signals which is used to access a memory that contains the correct tuning data for the voltage controlled oscillator to generate an RF signal.

9 Claims, 6 Drawing Figures

OPERATION CYCLE FOR RECEIVED RF SIGNAL
FIG. 5

OPERATION CYCLE FOR SELF CALIBRATION
FIG. 6

SELF-CALIBRATING MICROWAVE TRANSPONDER

GOVERNMENT CONTRACT

The invention herein described was made in the course of or under a contract or subcontract thereunder with the Department of the Army.

BACKGROUND OF THE INVENTION

1. Field of the Invention

This invention relates to microwave set-on transponders, and more particularly, to the generation of accurate RF signals by means of a voltage controlled oscillator in response to the carrier frequency of received low duty cycle pulse RF signals for jamming or disabling radar systems.

2. Description of the Prior Art

There is an important requirement for the microwave systems industry to be able to accurately set a microwave voltage controlled oscillator (VCO) on to the carrier frequency of a low duty cycle pulsed carrier waveform, where the input carrier frequency is unknown apriori over a wide bandwidth, typically an octave wide. The principal reason for doing this is to be able to generate microwave power on frequency in-between reception of the pulses to jam, for example a selected radar system. Often there is a related requirement for fast acquisition of the frequency of the pulsed carrier waveform. Additionally, in some systems it is required to memorize the various carrier frequencies when a number of interleaved asynchronous pulse trains are simultaneously present.

A number of methods are currently used to meet these requirements, but they all have certain drawbacks. One method is to sweep a narrowband receiver across the band of interest, and stop (briefly) at those frequencies to measure the tuning voltage. For each such tuning voltage there is a non-linear gain function that converts the bandpass tuning voltage to the appropriate driving voltage applied to the microwave VCO. One problem with this approach is eliminating one of the sidebands. This is difficult and expensive, especially if there is a large dynamic range of input power level. To avoid the unwanted sideband, a swept YIG filter can be used. Very often the instantaneous bandwidth is wider than is suitable for the desired level of resolution, but the main problem with this approach is that the preselection filtering employs a varying magnetic field, which cannot be varied quickly, as is sometimes needed, because of the inductance. However, no matter what their fast tuning capability is, the fact that the input is a low duty cycle, forces the search sweep rate to be very slow to insure that when the bandpass scans through a particular frequency it will be there long enough to receive a pulse. This means a slow lockup. Additionally, for both approaches there are severe calibration problems. To overcome the alignment problems, very tight specifications on the components are required, which raises the cost and lowers the reliability. The most important example of this is the phenomena known as "post tuning drift". That is, if you operate the VCO in one part of the band for some time, then move to another part of the band, the different tuning voltage causes a different level of power dissipation, which in turn changes the tuning transfer function. The only good way to solve this problem is to actually go to a different type of oscillator, usually the kind whose output frequency is based on a multiple of some lower accurately set frequency. This, of course, is expensive and cumbersome. Additionally, for such narrowband swept receivers, when operating in a multiple signal environment, the receivers are often required to have a relatively high data rate. This means that pulse repetition frequency (PRF) trackers are required so that the search-sweep can be interrupted long enough for the receiver bandpass to be quickly slewed bank to the expected frequency during the predicted time slot. This time multiplexing, if really needed, is what is responsible for the quick retuning requirement and is what rules out the swept YIG filter approach, since its tuning time constant is much too long to be compatible with the typical PRF rates, and the pulse densities to be expected.

To overcome some of these problems, receivers that are instantaneously broadband are often considered in the system design. One such method is to build a contiguous overlapping filter bank, with detectors on each channel. This makes for a very fast lockup system that does not need PRF trackers; however, it is a "brute force" approach that can be very costly and physically large. At the higher microwave frequencies, to maintain adequate accuracy over the same percentage bandwidth means that an enormous number of filters are required. There is also the question of the alignment of all these filters, in particular, whether there will be any "holes" in the spectrum, especially when temperature variations are considered since two adjacent filters may drift in opposite directions in response to the temperature change.

Another instantaneous bandwidth technique is the use of "Instantaneous-Frequency-Discriminators" (IFD's). These are microwave subsystems that contain rather short delay lines for which the reciprocal of the time delay gives a bandwidth on the order of the total bandwidth to be monitored. Through a series of couplers the delayed and undelayed signals are directed to four crystal detectors. Because of the frequency dependent phase differences, the power going to the crystals will split unequally. The output voltages are combined in pairs and are thus indicative of frequency. Two video voltages are available from the IFD that can be thought of as the X and Y rectangular coordinates of a vector whose magnitude is indicative of the input power to the IFD, and whose angle is indicative of the frequency. Thus, in theory these outputs can be used to set on or tune the VCO. Many of the old problems remain, however, including difficult alignment, tight specifications, and post-tuning drift. Included in this is a new and difficult problem of converting the rectangular IFD X and Y coordinates into a unique single valued voltage scale corresponding to frequency. What is required is to determine the function of Arc-tan (Y/X). To accomplish this, analog hybrid divider modules, along with circuitry that senses the quandrant, along with considerable extra circuitry is employed. Needless to say, this long serial string of components and modules is not conducive to accuracy. Investigations have been conducted aimed at performing the conversion digitally, but in either case the circuitry becomes quite complicated. The other alternative is just to use a portion of two of the quadrants—say the X-axis output. In this method it is hoped that the output amplitude should indicate frequency. This, of course, lowers the overall resolution capability of the IFD since two of the quadrants are wasted. Beside that, as stated above, the input power level influences the output amplitude, so the input must be very precisely limited. This is difficult, especially if, as is the case, the input pulse widths are on the order of the servo response times that are needed to do the limiting accurately enough.

Still another way to employ the IFD's is to employ a bank of them, each with 4X the resolution of the previous one and then sense which quadrant the output is in from each IFD. This has the advantage that only the polarity of each voltage need be sensed. There are crossover problems in doing this, however, that can lead to very large errors at certain transition points in the band. This can be overcome by employing still more IFD's properly offset to resolve the conflicts, but again this reduces to the brute force approach which quickly escalates the cost, although operationally it usually works fairly well. On the plus side, the IFD approaches give a fast lockup capability, and they do not need PRF trackers since they are instantaneously broadband. One drawback is that if pulses come in simultaneously, they will be read incorrectly; in some applications this is a problem.

Another whole category of transponder designs is to take the above-mentioned basic design alternative and introduce feedback. Although this may appear to make the system block diagram more complex, in actual practice the hardware will be a lot simpler, the component specifications can be looser, and is preferred in general. This usually eliminates the post tuning drift problem, particularly if the set-on is continually updated. If we apply this to the swept narrowband receiver approach, a number of the problem areas disappear, and indeed the cost of the extra circuit complexity is more than offset by the looser specs giving lower costs. There is the additional human factor benefit in that the risk that a technician or other field personnel will misadjust the critical alignment is largely eliminated. The system will still be plagued with a long acquistion time, and the problem of an unwanted sideband of an IF strip is avoided. A PRF tracker may still be required to separate pulse trains for carrier separations that are within the discriminator pull-in range, for general data update, and possibly a number of other reasons.

Using feedback in the filter bank approach eliminates the VCO tuning transfer function alignment problem, but does nothing for the interchannel alignment of the bank itself, and this approach is therefore generally discarded. Applying the feedback approach to IFD schemes also sees many of the alignment problems melt away; however, there is still the difficult problem of making the rectangular to polar conversion, including sensing the proper quadrant, although the requirements on this function are also somewhat eased since it can be thought of as part of the VCO tuning transfer function. Thus, rather tight tolerances on a long cumbersome serial chain of modules is still required. This approach, however, still has the benefit of fast lockup, and its independence of any PRF jitter problems.

Thus, in reviewing the most common transponder design approaches, it is evident that a simple low cost self-calibrating microwave transponder or set-on approach is still needed.

SUMMARY OF THE INVENTION

In accordance with the present invention which relates to broadband microwave transponders, a method and means is described for generating RF signals in response to the carrier frequency of received RF signals and for self-calibrating its RF signals to compensate for temperature, oscillator drift and component variations. A received RF signal passes through an RF amplifier, modulator and instantaneous frequency discriminator whereupon two video signals are derived which are used for generating a memory address signal which is used to address a memory. The memory output voltage value tunes a microwave voltage controlled oscillator to provide an RF output signal. A self-calibrating means stores the voltage values corresponding to all possible frequencies into the memory in advance. The voltage values are generated by tuning the voltage controlled oscillator with a selected voltage and by coupling the output of the voltage controlled oscillator to the RF amplifier. The selected voltage value is stored in the memory when a memory address has been generated due to the voltage controlled oscillator signal coupled to the RF amplifier.

DESCRIPTION OF THE PREFERRED EMBODIMENTS

Figure 1:
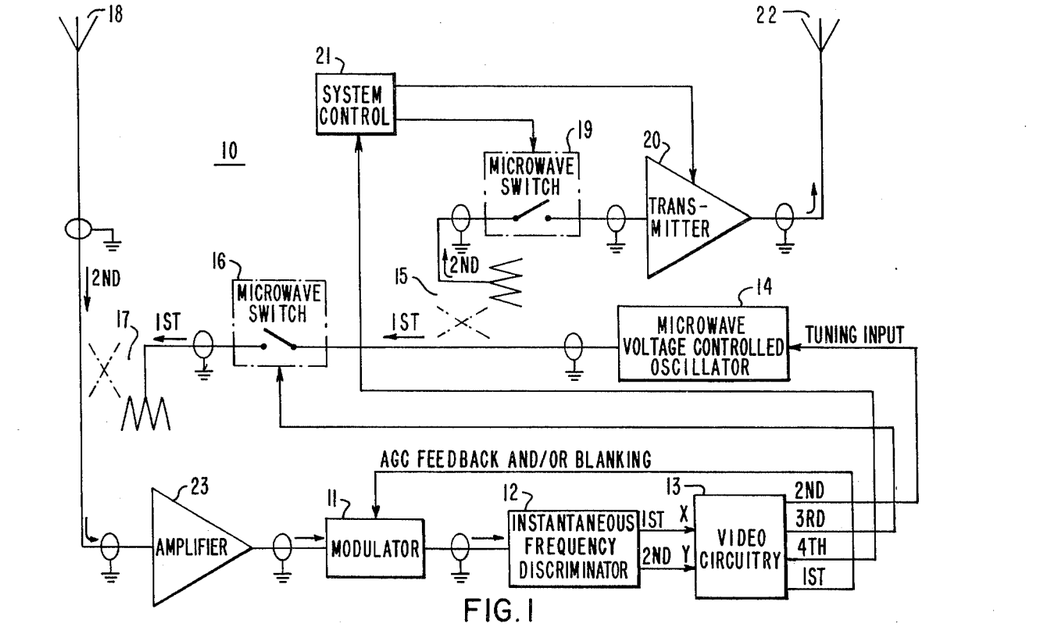
FIG. 1 is a schematic and block diagram of one embodiment of the invention.

Referring to FIG. 1, an accurate self-calibrating microwave transponder or set-on is shown. The output of modulator 11 is coupled to the input of instantaneous frequency discriminator 12. A first and second output of instantaneous frequency discriminator 12 is connected to a first and second input of video circuitry 13. A first output of video circuitry 13 is connected to modulator 11 to provide an automatic gain control feedback and/or blanking signal to the modulator 11 for controlling the amplitude of RF signals passing through the modulator 11 and into instantaneous frequency discriminator 12. A second output of video circuitry 13 is coupled to the tuning input of microwave voltage controlled oscillator 14. The output of microwave voltage controlled oscillator 14 is coupled to an input of coupler 15 which has a first output coupled to microwave switch 16 and a second output coupled to microwave switch 19. Video circuitry 13 has a third output coupled to microwave switch 16 to control the switch on or off. The output of microwave switch 16 is coupled to a first input of coupler 17. Antenna 18 for receiving RF signals is coupled to a second input of coupler 17 which has an output coupled to the input of amplifier 23. The output of amplifier 23 is connected to the input of modulator 11. A fourth output from video circuitry 13 is connected to an input of system control 21 to provide a signal indicative of detection of a pulse RF signal. The output of microwave switch 19 is coupled to the input of transmitter 20 which receives a control signal from system control 21. Microwave switch 19 also receives a control signal from system control 21 for turning the switch on or off. The output of transmitter 20 is coupled to antenna 22 for transmitting RF signals. In FIG. 1, short arrows are shown adjacent to RF signal lines which carry RF signal power. The arrows show the flow of RF power on these lines which must be electrically suitable for conducting RF power, such as by the use of microwave transmission lines such as coaxial or microstrip lines. The function of modulator 11 is to keep the RF signal voltage constant in amplitude. An example of a modulator that may be used for modulator 11 is Model CAA6003, manufactured by Crown Microwave, Inc. Modulator 11 may also be a self-biasing modulator limiter or a true (microwave-carrier) clipping type limiter which has the advantage of speed, but does not have much flexibility in determining the operating point since they have no provision for connecting a feedback signal from video circuitry 13. An example of a self-contained limiter suitable for modulator 11 is Model CL3003, manufactured by Crown Microwave, Inc. Modulator 11 is not very expensive since the limiting does not have to be extremeley "hard" limiting typically present in most IFD approaches. A simple "soft" limiter is adequate. In a typical modulator, the more current provided by the control line, the more attenuation the modulator will exhibit to the RF signal passing through it.

The IFD 12 is employed to achieve an instantaneous wide bandwidth, eliminating the need for any narrowband time consuming sweep search. The IFD 12 is a standard component available to industry and may also be known as instantaneous frequency measurment (IFM). An example of an IFD suitable for IFD 12 is Model 120408, manufactured by Anaren Microwave, Inc, which has a frequency range from 8 to 12 gigahertz. The specifications required for IFD 12, such as linearity, drift, and absolute accuracy, are looser by at least an order of magnitude better than the IFD vendors are accustomed to dealing with. In other words, the crudest bottom-of-the-line IFD which may be purchased very inexpensively may be used. Similarly, the modulator 11 in its simplest form may consist of just a microwave modulator.

An example of a voltage controlled oscillator suitable for voltage controlled oscillator 14 is Model 5601D, manufactured by Gigahertz Devices. An example of a coupler suitable for couplers 15 and 17 is Model PRD4510, manufactured by PRD Electronics, Inc. An example of a microwave switch suitable for implementing microwave switches 16 and 19 is Model No. CS1051, manufactured by Crown Microwave, Inc. or Model GC-74004, manufactured by Gigahertz Devices. An example of an amplifier suitable for amplifier 23 is Model 848HS or Model 219H, manufactured by Hughes Aircraft Corporation. Transmitter 20 is conventional in the art and may, for example, contain a traveling wave tube (TWT) having an output power of 500 watts. Antennas 18 and 22 are conventional in the art. System control 21 which is conventional in the art functions to control microwave switch 19 and transmitter 20 to control the transmission of an RF signal generated by microwave voltage controlled oscillator 14.

Figure 2:
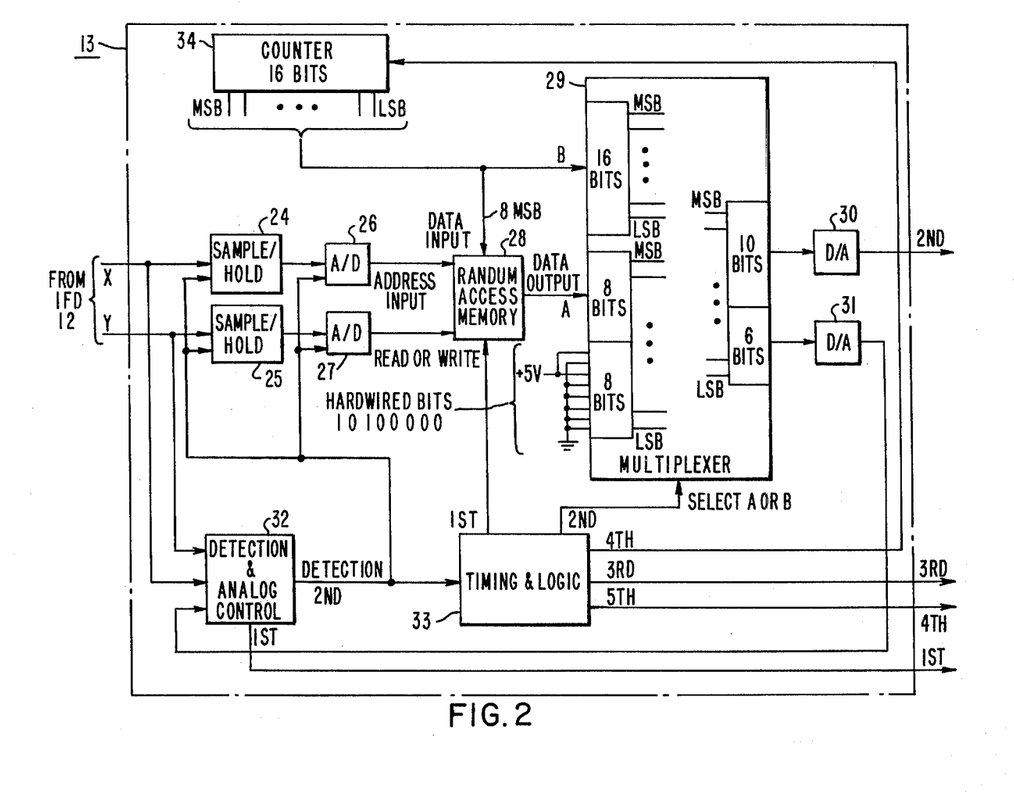
FIG. 2 is a schematic and functional block diagram of one embodiment of the video circuitry 13.

Referring now to FIG. 2, which is a block diagram of video circuitry 13, a first output from IFD 12 designated X is connected to an input of sample-and-hold 24, which holds the input sampled at a point in time on its output for a certain amount of time and to an input of detection and analog control 32. A second output from IFD 12 designated Y is connected to an input of sample-and-hold 25 and an input of detection and analog control 32. Detection and analog control 32 has a first output which is also the first output of the video circuitry 13 which is the automatic gain control feedback and/or blanking signal connected to modulator 11 for controlling modulator 11. Detection and analog control 32 has a second output which is connected to an input of timing and logic 33. Detection and analog control 32 receives an input from D/A 31 to provide a deliberate error bias signal. The output of sample-and-hold 24 is coupled to the input of A/D 26 and the output of sample-and-hold 25 is connected to an input of A/D 27. Sample-and-hold circuits 24 and 25 may not be necessary if the received RF signal pulses are long, with respect to the time for the A/D converter to convert the input to a digital signal, in which case, the input would be connected to the output of sample-and-hold 24 and 25, respectively. An example of an A/D converter suitable for A/D 26 or 27 is one that would have a conversion time in 400 nanoseconds and have 5-bit resolution. The output of A/D 26 is connected to a portion of the address input of random access memory (RAM) 28. The output of A/D 27 is connected to a portion of the address input of RAM 28. The data output of RAM 28, 8 bits, is connected to the most significant bits (MSB) of the A input of multiplexer (MUX) 29. Eight hard wired bits (10100000) are connected to the least significant bits of the A input of MUX 29. Each bit may be hard wired by connecting it to ground for a 0 and to +5 volts for a 1. Model SN 54157, manufactured by Texas Instruments would be suitable for MUX 29. An output of the 10 most significant bits of MUX 29 is connected to D/A 30 and a second output of MUX 29 is connected to D/A 31. The output of D/A 30 is the second output of video circuitry 13 and is connected to the tuning input of voltage controlled oscillator 14. Timing and logic 33 has a first output which is connected to the read or write input of RAM 28 for determining when RAM 28 shall read or write. A second output of timing and logic 33 is connected to the select A or B input of MUX 29 for determining which of the two input signals, 16 bits of A or B, is presented at the output of MUX 29. A third output of timing and logic 33 is connected to microwave switch 16 for controlling switch 16 which is also known as the third output signal of video circuitry 13. A fourth output signal of timing and logic 33 is connected to an input of counter 34 which may, for example, have 16 bits. The 8 MSB's of the output of counter 34 having 16 bits are connected to the data input of RAM 28 and the total 16 bits are connected to the B input of MUX 29.

As shown in FIG. 2, the difficult problem of converting the IFD 12 first and second output voltages represented by X and Y into a monotonic voltage swing compatible with the (non-linear) VCO 14 tuning requirements is solved by not doing it! This set-on technique design philosophy employs a self-calibration scheme that eliminates the need for any adjustment and/or tight accuracy specifications on the components, as well as automatically adjusting to aging and temperature drift.

The first and second output signals of IFD 12 video X and Y are connected to video circuitry 13 by way of sample-and-hold circuitry 24 and 25 or direct to the A/D converters 26 and 27 if the RF pulse length is long and the sample-and-hold circuits 24 and 25 are unnecessary. The outputs of A to D 26 and 27 form a combined digital data signal which is employed as an address to the random access memory 28. The random access memory 28 has an output which is fed through a 2:1 multiplexer 29 to a D/A converter 30, which tunes the microwave VCO 14 with the addition of two hardwired LSB's. The other data input to the multiplexer 29 is simply a counter 34 whose data can therefore also be steered to the microwave VCO 14 in the place of the random access memory data and two LSB's when desired. Additionally, there is a relatively small number of logic gates and timing multivibrators in timing and logic 33 to provide a timing signal to the random access memory 28, the multiplexer 29, the counter 34, switch 16 and system control 21. Timing and logic 33 is initiated or started on its timing cycle by a signal from the second output of detection and analog control 32 which detects when an RF signal is present, indicating when either the X or Y inputs to video circuitry 13 have a non-zero voltage. Timing and logic 33 can also initiate a self-calibration cycle when desired.

The configuration shown in FIG. 2 is designed to operate on a pulse-to-pulse basis. This means that for each pulse detected (in many systems the input is turned off and on in a preset sequence, to allow for transmission with insufficient antenna isolation, and for other reasons) the VCO 14 will be quickly tuned to that carrier, irrespective of the past history of operation. This design can, of course, easily be extended to handle multiple carrier interleave pulse trains when the goal is to return each frequency irrespective of whether that pulse is present, by adding some more digital memory to remember the proper address of the RAM 28 or the data output of the RAM 28 of pulses from each of several interleaved pulse trains and additional logic and control circuits to return to each pulse train frequency, irrespective of whether that pulse is present. In no way, however, does it significantly modify the unique, important characteristics inherent in the configurations shown in FIGS. 1 and 2.

Figure 3:
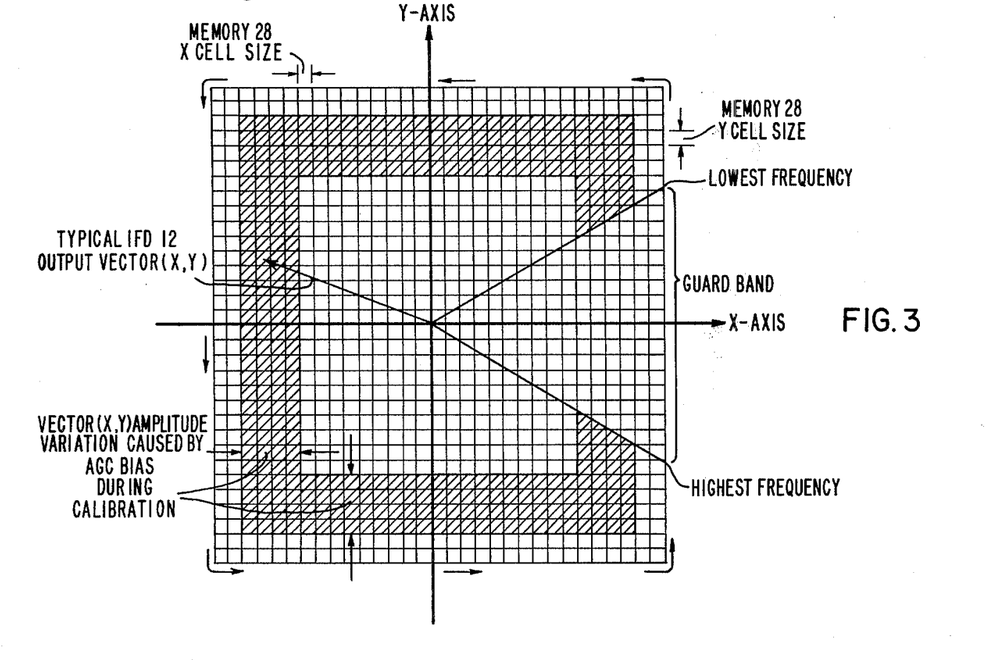
FIG. 3 is a graphical representation of the memory location in a memory with respect to the memory address derived from the IFD.

FIG. 3 is a graphical representation of the IFD 12 output. The grid lines shown on this Figure represent the analog to digital conversion 26 and 27 of the first and second outputs, X and Y, from IFD 12. The reason that the loci of vector pssibilities fall along a square-shaped figure shown by cross-hatching is that the first output signal of detection and analog control 32 will servo or swing to make the largest absolute value of either X or Y to be representative of the amplitude of the RF signal which is the control input to modulator 11. Each of the little boxes in this Figure constitute one addressable cell in which there can and will be accessible digital data for tuning the voltage controlled oscillator 14. The output of memory 28, required for a typical application, is compatible with having just a few random access memory integrated circuits, such as eight Model 9102 DM devices, manufactured by Advanced Micro Devices, Inc. or a few number of storage bits, in light of the level of random access memory technology now available in the industry. Other memory types would also be suitable with slight modifications, such as serial or associative memories.

Figure 4:
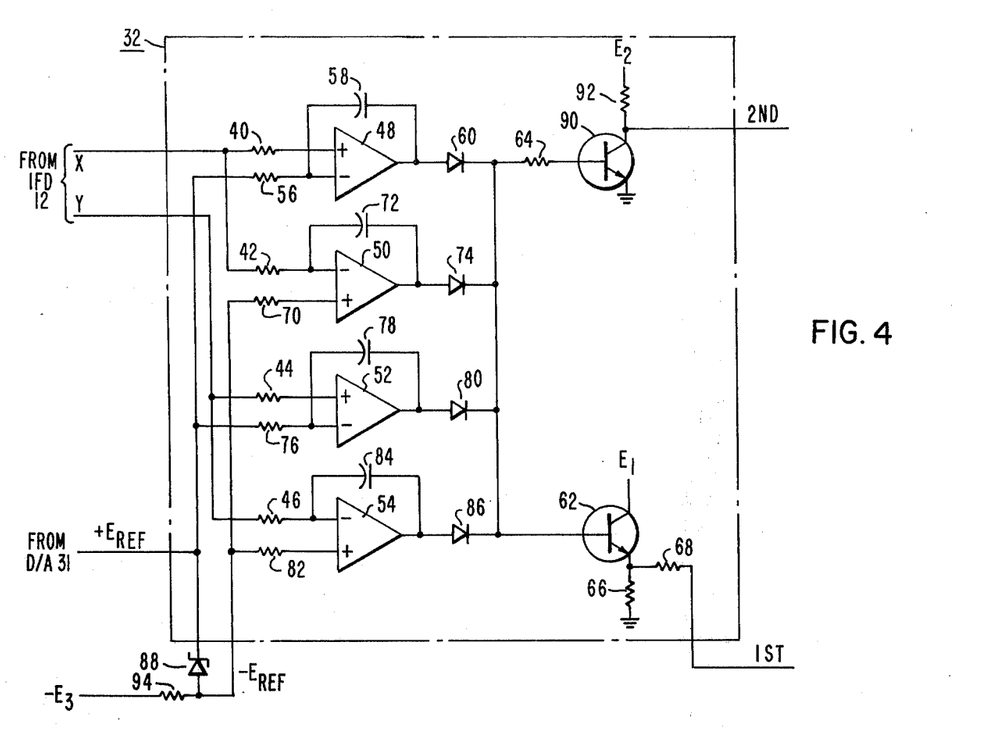
FIG. 4 is a schematic of one embodiment of detection and analog control 32.

Referring now to FIG. 4, one embodiment of detection and analog control 32 is shown. A first output from IFD 12 is connected to resistors 40 and 42. A second output from IFD 12 is connected to resistors 44 and 46. Resistor 40 is connected to the plus side of amplifier 48. Resistor 42 is connected to the minus input of amplifier 50. Resistor 44 is connected to the plus input of amplifier 52. Resistor 46 is connected to the minus input of amplifier 54. Amplifier 48, 50, 52 and 54 may be operational amplifiers such as Model OP-01, manufactured by Precision Monolithics, Inc. having a slew rate of 18 volts per microsecond and a settling time of 0.7 microseconds. A positive voltage reference $E_{ref}$ from D/A 31 of about 1 volt is connected to the minus input of amplifier 48 through resistor 56. Capacitor 58 is connected to the minus input of amplifier 48 and the other side is connected to the output of amplifier 48. The anode of a diode 60 is connected to the output of amplifier 48 and the cathode is connected to the base of transistor 62 and resistor 64. The collector of transistor 62, which may be an NPN transistor, is connected to a positive voltage $E_1$ and the emitter is connected to ground through resistor 66 and is connected to modulator 11 through resistor 68, which is the first output of video circuitry 13.

A negative reference voltage $-E_{ref}$ of about $-1$ volt, located at the anode of zener diode 88, volt is connected to the positive input of amplifier 50 through resistor 70. Capacitor 72 is connected from the minus input of amplifier 50 to its output. The anode of diode 74 is connected to the output of amplifier 50 and the cathode is connected to the cathode of diode 60. The positive reference voltage $+E_{ref}$ is connected to the minus input of amplifier 52 through resistor 76. Capacitor 78 is connected from the minus input of amplifier 52 to its output. The anode of diode 80 is connected to the output of amplifier 52 and the cathode is connected to the cathode of diode 60. The minus reference voltage $-E_{ref}$ is connected to the positive side of amplifier 54 through resistor 82. Capacitor 84 is connected from the minus input of amplifier 54 to its output. The anode of diode 86 is connected to the output of amplifier 54 and the cathode is connected to the cathode of diode 60. The input from D/A 31 which is signal deliberate error bias is the positive voltage reference $E_{ref}$ which is also connected to the cathode of zener diode 88 with the anode of zener diode 88 connected to voltage $-E_3$ through resistor 94. The value of the zener diode may, for example, be 2 volts. The cathode of diode 60 is connected to the base of transistor 90 through resistor 64. The emitter of transistor 90 is connected to ground and the collector is connected to timing and logic 33 which is the second output of detector and analog control 32. The collector is also connected to voltage $E_2$ which may be 5 volts through resistor 92. The circuitry associated with amplifiers 48, 50, 52 and 54 is arranged so that the largest magnitude of signals X or Y, whether positive or negative, will provide the greater voltage on one of the outputs of the amplifiers. Diodes 60, 74, 80 and 86 will combine or OR the output of the amplifier with the highest voltage to the base of transistor 62, which supplies the feedback signal to modulator 11. Modulator 11, therefore, will be controlled by the largest magnitude of signals X and Y, whether positive or negative. If no RF input signal is present, the output voltage of the amplifiers will be approximately zero, and the voltage on the base of transistor 90 will cause the transistor to cut-off the output on the collector of transistor 90 will be a logic one. When an RF input signal is received, the output voltage of one of the amplifiers will be above 0 volts and transistor 90 will be saturated and the output (collector) of transistor 90 will be low or a logic zero for TTL levels. Transistor 90 functions to indicate the detection of an RF signal. Positive voltage reference $E_{ref}$ from D/A 31 will at appropriate times be driven from counter 34 to provide a modified amplifier output to drive modulator 11 through transistor 62.

Figure 5:
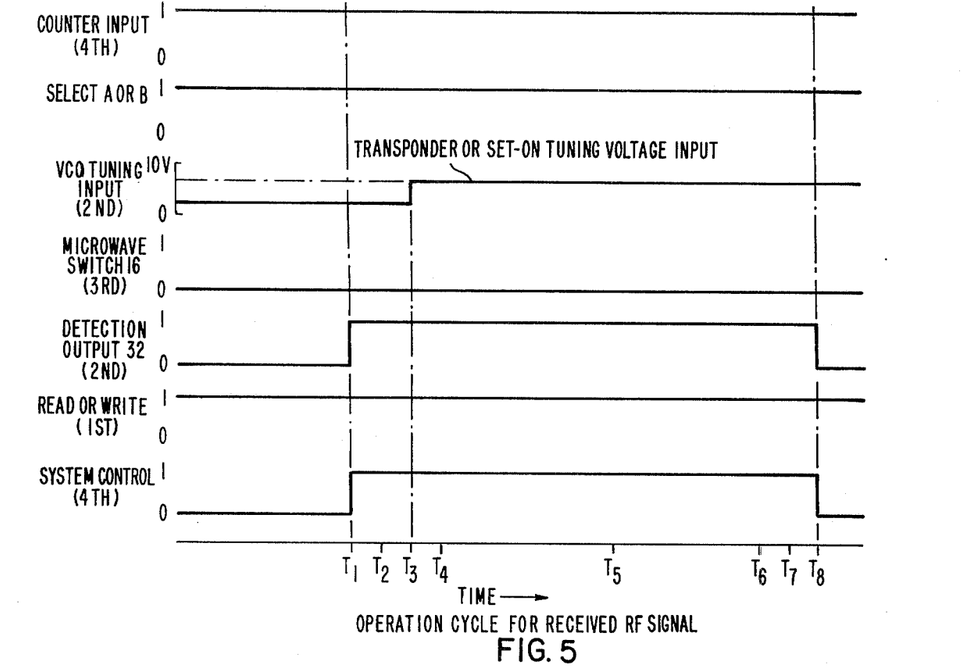
FIGS. 5 and 6 show a set of waveforms illustrating operation of the embodiment shown in FIG. 1.

The operation of the invention as shown in FIGS. 1, 2, 3 and 4 is described with reference to the waveforms in FIGS. 5 and 6 and by the following description. The receive antenna system 18 of FIG. 1 will pick up the microwave pulse radiation which will propagate through at least the coupler 17 and the preamplifier 23 feeding into the modulator or limiter 11. Some of the energy passing through this limiter 11 will impinge on the IFD 12 causing non-zero X and Y video voltages to be generated. If the limiter 11 is not a self-contained device, then the largest of the absolute value of the X and Y signals will drive an op-amp servo 32 to push bias current into the modulator 11 until the signal is limited to the desired IFD 12 voltage, as shown in FIG. 4.

In any event, when an input pulse occurs, the IFD 12 output will be a vector, where the two X and Y video signals are such that $\tan^{-1}(Y/X)$ is linearly proportional to frequency, and $(X^2 + Y^2)^{1/2}$ is proportional to amplitude in a square law fashion and is what may be used for limiting purposes. (See FIG. 3.) These X and Y signals are now A/D converted by A/D 26 and 27 (once the pulse amplitude has stabilized). The signal flow now proceeds to the RAM 28, where it is used as an address to access a particular cell in memory 28 without any explicit regard to the meaning of the data, including the relationship between the X number and the Y number. The addressed cell now presents its contents to one of the inputs (the A input of FIG. 2) to the MUX 29 (note that the number of bits called up may be more or less than the number of bits of data involved in the address). The MUX 29, going from its interpulse state (during which it may not pass any data) to its intrapulse state, as determined by the control logic 33, will pass this data on to the D/A converter 30. The output of the D/A converter 30 now slews to the voltage specified by the digital word. This voltage is the tuning voltage required by the VCO 14 to match its frequency to that of the incoming pulse carrier. The microwave output switch 19 may now be turned on by the system logic 21 to cause transmission at the proper microwave carrier frequency.

Notice that the RF signal flow is quite straight-forward. The question is how did the proper digital word or voltage value get into that memory address cell, especially when one takes into account the offset bias's inherent in the A/D 26 and 27, D/A 30 and VCO 14 along with the non-linearities present especially in the VCO 14. This technique only requires that the IFD 12 outputs X and Y form a transfer function that is monotonic with respect to the RF frequency and have absolute predeterminability only on a very gross scale.

By definition, a digital RAM 28 does not need to have any permanent nonvolatile storage in the memory. In this technique, the loading of the proper tuning data in digital form is an on-going never ending process, albeit at very low duty cycle so as not to interfere with the normal transmitting and enviroment sensing functions of the system. The specific data needed is immediately available because the digital tuning word for each and *every* possible input pulse has been loaded during the recent past. Since it is an on-going process, as the components drift or age, or if the tuning voltage to the VCO 14 changes because of changes in the scenario of time sharing between different frequencies (the most troublesome source of error in many microwave transponder or set-on systems), the data is continually "refreshed" and thus made accurate.

Figure 6:
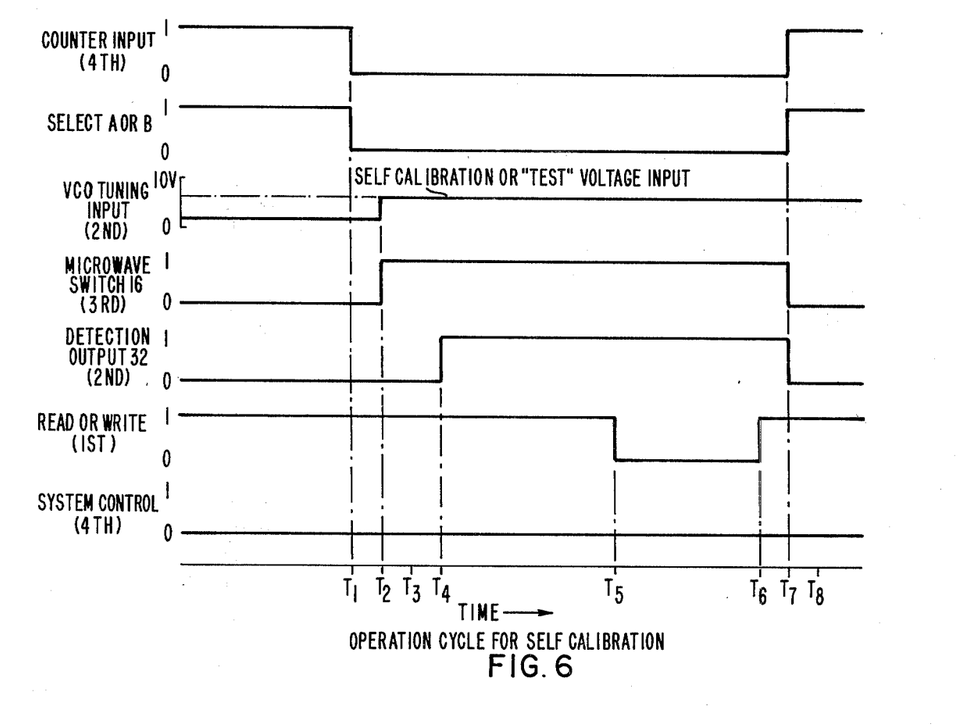

Specifically, the loading of the proper digital tuning words illustrated by the waveforms in FIG. 6 is accomplished as follows, without the need for calculations. At periodic intervals, the timing and logic circuit 33 of FIG. 2 selects the counter 34 (B input) to be briefly routed through the MUX 29 to the D/A converter 30. After allowing (typically a few microseconds) for settling, the logic pulses the microwave switch 16 sending energy into the feedback path. As seen in FIG. 1, this causes the VCO 14 microwave carrier (now tuned to the counter's digital word) to be coupled by coupler 17 back onto the input line, propagate through the amplifier 23, and impinge on the limiter 11. The IFD 12 and limiting control circuitry in 32 operate normally, that is no different than if it were a bonafide input pulse. Thus, the IFD 12 video voltages are soft limited to the proper voltages and fed into the A/D converter 26 and 27 which also operates normally. The A/D converter's 26 and 27 digital word now addresses a particular cell or digital word in the RAM 28. The timing and logic circuit 33 tells the RAM 28 to load or write the counter's 34 word or value into this memory cell or digital word location, destroying the previous data and storing the new value or digital word to be used to drive the VCO 14 if this location is addressed.

The sequence for this self-calibration or "test" pulse cycle is now completed for one digital word from counter 34. The microwave switch 16, the MUX 29, and the RAM 28 are returned to normal. The IFD 12, limiter 11 and A/D converters 26 and 27 never "knew" there was anything special about the self-calibration or "test" pulse. The counter 34 is clocked one count, and then the self-calibration or test mode remains quiescent/off until the timing and logic circuit 33 determines that it is ready for another test pulse. A typical duty cycle is 0.1%, thus avoiding interference with the RF signal receive mode. Over the course of many self-calibration or "test" pulse cycles, the counter 34 goes through all possible counts, which represent all possible tuning voltages corresponding to all possible frequencies.

It can therefore be seen that as each arbitrary digital tuning voltage is used for a self-calibration or "test" pulse, the system essentially asks the question by placing a voltage on VCO 14: "What digital (address) word will the input sensing circuit have at this particular microwave frequency or tuning voltage?" It stores that correspondence, so that if a bonafide input or signal pulse also creates that digital (address) word, then by definition the corresponding stored digital tuning word for VCO 14 must be the correct value.

Since this system goes ahead and calibrates all possible tuning voltages by many self-calibration or "test pulse" cycles, there is no requirement for having to calibrate the system in real time. The only assumption is that the IFD 12, limiter 11, A/D's 26 and 27, D/A 30, and VCO 14 operate the same for the input RF signal pulses as for the self-calibration or "test" pulses, at least over the short run until self-calibration is repeated.

There are, however, two possibilities for error remaining, which fortunately can be easily taken care of. Both cases involve the danger that an input RF signal pulse will create an address which calls up a memory cell that has not previously been loaded with a digital VCO 14 tuning word. Two simple "fixes" will assure that this never happens. The first is that the D/A 30, MUX 29, and counter 34 (see FIG. 2) all handle (at least 2) more bits of data than the RAM 28 structure is capable of dealing with, particularly if the VCO 14 transfer function is very nonlinear. When the MUX 29 passes the RAM 28 data, hard wired "dummy" LSB (least significant bits) are tacked on. The extra LSB's feeding the RAM 28 input from the counter 34 are not used. What this "fix" accomplishes is having the step-size, on the microwave frequency scale, be much smaller than the size of the RAM 28 memory cells. Thus, the self-calibration or "test" pulses will load in a number several times (typically 4) within a cell before it has progressed to the next cell. Of course, the cell will remember the last such value loaded. This assures that the calibration process does not skip over a cell due to nonlinearities. However, the cells have a two dimensional geometry, as shown in FIG. 3, and no matter how close the test pulses occur, and no matter how accurate the limiting process is, they may still straddle the corner of an adjacent cell, particularly if the IFD 12 vector angle is on the diagonal (such as 45°, 135°, 225°, 315°). It was said that the input sensing circuit was supposed to act the same for self-calibration or "test" pulses as for bonafide input RF signal pulses, yet these true input RF signal pulses cover a wide dynamic amplitude range. This means that the limiting circuit may not act quite the same, and hence throw the digital address to an uncalibrated memory 28 digital word location or cell whether or not the IFD 12 vector is on the diagonal. It would be undesirable to demand extreme accuracy of the limiting process by modulator 11 in combination with its control signal; instead, the system deliberately throws an error to the limiting process during the self-calibration or "test" pulses. Therefore, the second fix specifically consists of the following: for each step in microwave frequency of the calibration process, a number of additional steps are made in the amplitude of a deliberate error bias of the nominal microwave limiting stable point. This will swing the amplitude above, through, and below the normally expected range of error of the "stable" operating point due to the soft-limiting characteristics. FIG. 3 shows that the calibration process rather than following the path of a line, is spread out into a wide ribbon of values (forming a square) in the X–Y coordinate system. Of course, a non-zero deliberate error bias is never put on the limiting circuit during normal (i.e., non-self-calibration or test pulse) intervals. An alternative fix is to have a modulator in the feedback path from the microwave VCO 14 that is modulated over greater than the expected dynamic range of the bonafide input pulses. This also would assure that all memory cells that any input RF signal pulse would call up, will have the proper digital VCO tuning word in the memory 28.

In either event, it is seen that this is simply accomplished by having a second D/A converter 31 that will vary the limiting stable point or vary the feedback modulator signal. This D/A 31 is driven by extra bits in the counter, while if the RAM 28 is steered through the MUX instead, then these bits are just hard wired to the nominal value.

Note that if the modulator or limiter 11 were self-contained, then the "ribbon" of loaded cells or memory 28 data words in FIG. 3 would be circular instead of square.

An additional feature that can be added if desired is the ability to operate in a multiple pulsed signal environment with interleaved pulse trains, while repeating or setting on to any arbitrary one of these carriers inbetween pulses at any arbitrary time. This can be accomplished simply by counting the number of times input pulses fall into particular cells in memory 28. These cells for which the number of counts per unit time exceed the threshold (or other more sophisticated criteria) determine the frequencies at which the microwave transponder or set-on should transmit, driving the VCO 14 with the cell value.

Very often such a set-on system will be employed in a larger system that breaks the total available bandwidth down into a number of frequency channels. These channels are created by the use of filter banks. Typically, each such channel has a simple video detection that indicates the receipt of pulses within the channel. Since the IFD 12 is basically a wideband device, the delay line in the IFD 12 can be made to be just short enough so that the mathematical reciprocal of its delay is just greater than the widest channel bandwidth. This means that the IFD 12 vector X and Y will wrap around multiples of 360° many times across the RF band. (This is to be compared to the technique shown in FIG. 3, where there is a deliberate "guard band" to assure that the loci of possible vector angles do not overlap.) The channel video detectors, operating through a flip-flop, can then be treated as an extra bit of data to the A/D address, thereby providing extra accuracy and other data features.

Still another variation can be employed if extreme accuracy is desired, without increasing the memory size. Notice in FIG. 3 that most of the memory cells are left blank because they are not included in the locus "ribbon" of possible addresses. If now there is sufficient allowable response time, and a modulator were used instead of a "true" self-contained limiter, then the loop gain could be made very high, though the absolute limiting level still would not be critical, and could drift. This high speed AGC would operate on the stongest of the absolute value of X and Y. The AGC circuit could therefore give a 2-bit code indicating which side of the square in the X–Y plane the input was on. This would be used to select the remaining address word from the appropriate A/D converter 26 or 27. For example, suppose FIG. 3 represented a 10 bit addressable RAM. This would normally mean that 5 bits of data would be taken from each A/D. However, with this optional approach 8 bits of data can be taken from either the X or Y A/D converter, depending on which was *not* at the AGC level, combined with the 2 bits from the AGC (quadrant data) to give the total 10 bits. This obviously gives considerably more resolution with the same memory size. Essentially, the ribbon of values in FIG. 3 has been shrunk to be about one cell wide, making more efficient use of the available memory in memory 28. This does, however, assume that each side of the square of locus values is perfectly horizontal or vertical and does not move appreciably over the input amplitude dynamic range, and that, as stated, the response settling time is consistent with the expected input pulse width.

Another feature is to have the AGC circuit 32 blank the input during transmission modes to prevent unwanted feedback through the antenna system, and preserve the AC coupling of the IFD 12, if needed.

A self-calibrating microwave transponder for generating RF signals is described by placing a selected voltage on the tuning input of a VCO and coupling the output to the input amplifier which normally receives the RF input signals. The output of the amplifier is coupled to an instantaneous frequency discriminator through a modulator which controls the gain of the RF signal and where the discriminator provides two video voltages which are unique for the amplitude and frequency of the RF signal. The unique combination of the output voltages of the discriminator is used to provide a memory address for addressing and storing in the memory the voltage applied to the tuning input of the VCO. The transponder is normally operated by uncoupling the VCO from the input amplifier and coupling an input RF signal to the input amplifier, whereupon, for the same frequency and amplitude, the memory will access a digital word containing a value for driving the VCO. The output of the VCO will be an RF signal which is self-calibrated by a prior test voltage so that the output corresponds to the input RF signal and is suitable for transmitting by the transponder for jamming, for example, a selected radar system.

I claim:

1. A self-calibrating microwave transponder for generating RF signals in response to the carrier frequency of received RF signals comprising:
    an RF amplifier coupled to an input for receiving and amplifying said received RF signals;
    a modulator coupled to said RF amplifier for limiting the amplitude of said RF signals;
    an instantaneous frequency discriminator coupled to said modulator and having a first and second output terminal for providing a first and second video signal in response to said RF signals;
    circuit means coupled to said first and second output terminal for generating a memory address signal;
    memory means coupled to said circuit means for providing a memory output in response to said memory address signal;
    a microwave voltage controlled oscillator coupled to said memory means and responsive to said memory output for providing an RF output signal; and
    self-calibrating means for storing voltage values into said memory means.

2. A self-calibrating microwave transponder of claim 1 wherein said self-calibrating means includes means for coupling the output of said voltage controlled oscillator to said RF amplifier, means for tuning said voltage controlled oscillator with a selected voltage, and means for storing said selected voltage value into said memory means when said circuit means has generated a memory address signal in response to the coupling of the output of the VCO to said RF amplifier.

3. A self-calibrating microwave transponder of claim 1 wherein said self-calibrating means includes means for generating an automatic gain control feedback signal and said modulator is responsive to said automatic gain control feedback signal.

4. A self-calibrating microwave transponder of claim 3 wherein said means for generating an automatic gain control feedback signal includes blanking with said feedback signal.

5. A self-calibrating microwave transponder of claim 1 wherein said modulator is a self-contained limiter.

6. A self-calibrating microwave transponder of claim 1 wherein said memory means includes a random access memory.

7. A method of self-calibrating a microwave repeater comprising the steps of:
    tuning a VCO with a selected voltage;
    generating an RF output signal from said VCO;
    coupling said RF ouput signal into an input amplifier for amplifying said RF signal;
    limiting said RF signal;
    discriminating said RF signal generating a video output;
    forming a memory address signal from said video output signal;
    addressing a memory with said memory address signal;
    writing said selected voltage into said addressed memory.

8. A method for operating a self-calibrating microwave repeater comprising the steps of:
    receiving and amplifying an RF signal;
    limiting said RF signal;
    discriminating said RF signal generating a video output;
    forming a memory address signal from said video output;
    addressing and reading a memory with said memory address signal;
    generating a memory output; and
    tuning a VCO with said memory output generating an RF output signal.

9. A self-calibrating microwave transponder for generating RF signals in response to the carrier frequency of received RF signals comprising:
    an antenna input;
    an RF amplifier coupled to an input for receiving and amplifying said received RF signals;
    a modulator coupled to said RF amplifier for limiting the amplitude of said RF signals;
    an instantaneous frequency discriminator coupled to said modulator and having a first and second output terminal for providing a first and second video signal in response to said RF signals;
    circuit means coupled to said first and second output terminal for generating a memory address signal;
    memory means coupled to said circuit means for providing a memory output in response to said memory address signal;
    a microwave voltage controlled oscillator coupled to said memory means and responsive to said memory output for providing an RF output signal;
    self-calibrating means for storing voltage values into said memory means;
    a microwave switch having an input coupled to said RF output signal;
    a transmitter coupled to said microwave switch;
    an antenna coupled to said transmitter; and
    a system control coupled to said microwave switch and said transmitter for controlling transponder transmissions.

* * * * *